May 31, 1966  R. L. McCORKLE ET AL  3,253,616

FLUID PRESSURE PULSER

Filed Feb. 1, 1965  2 Sheets-Sheet 1

Russell L. McCorkle
Robert L. VanVoorhies
Eugene H. Okrent
John S. Wiedemann

INVENTORS

BY David A. Roth

PATENT ATTORNEY

Russell L. McCorkle
Robert L. VanVoorhies
Eugene H. Okrent
John S. Wiedemann

INVENTORS

BY Donald F. Wolters

PATENT ATTORNEY

United States Patent Office 3,253,616
Patented May 31, 1966

3,253,616
FLUID PRESSURE PULSER
Russell L. McCorkle, Brielle, Robert L. Van Voorhies, Mountainside, Eugene H. Okrent, Middletown, and John S. Wiedemann, Millington, N.J., assignors to Esso Research and Engineering Company, a corporation of Delaware
Filed Feb. 1, 1965, Ser. No. 431,244
2 Claims. (Cl. 137—625.21)

This application is a continuation-in-part of applicants' prior copending application Serial No. 168,427 filed January 24, 1962, now abandoned.

This invention relates to apparatus for transmitting programmed signals, in the form of pressure pulses, to different transmission lines in a hydraulic system. In particular the invention relates to novel apparatus for producing predetermined pressure pulses which may be controlled and shaped in any desired time-pressure pattern.

By the terms "hydraulic system," is meant to describe a system of transmission in which an incompressible fluid is used as a power transmission medium. Although the term "hydraulic" has the connotation of water, the term is used herein to mean any incompressible fluid, including petroleum based fluids, chemical based fluids, or any material that becomes a liquid under the pressure or operating temperature of the equipment.

Hydraulic systems are designed to provide a continuous supply of hydraulic pressure or power. This can be done by various mechanisms, such as continuously operating pumps, continuously operating pumps in conjunction with intermittent operating (translational) motors, and continuously operating pumps, and continuously operating (rotational) motors. In such a system, there will be various valves, such as sequence valves, flow valves, and reducing valves, to control the pressure head of hydraulic power, as well as transmission lines to transmit the hydraulic power to the particular operational area.

Hydraulic systems are used commercially in many ways. For instance, there are hydraulic presses for the metal working and process industries, the latter of which form substances like plastics or rubber. In such operations as transfer molding, the pressures which are developed or transferred may be used for forming, drawing, punching, straightening, forcing, hot forging, extrusion, and the like. Hydraulic controls and drives for machine tools are also widely used. Thus, reciprocating tools such as planers, shapers, grinders, milling machines, die casting operations, plastic injection molding machinery, and the like, are all commonly designed for hydraulic control.

This invention makes possible a simplified method of fully automatic cycle control of any of the complex hydraulic operations described above. For example, it would be possible to duplicate exactly, intricately shaped parts which would be formed by machinery controlled or powered by various applications of hydraulic systems. Therefore, it is an object of this invention to transmit programmed pressure pulses of predetermined time-pressure pattern, from a single pressure source, to one or more receiving circuits in a hydraulic system.

Accordingly, it is a principal object of the invention to provide a novel apparatus for producing a shaped hydraulic impulse, said impulse having a predetermined time-pressure pattern.

Another object of the invention is to provide a novel apparatus of the type described wherein a plurality of pressure pulses having different time-pressure patterns may be obtained during a single operating cycle of said apparatus.

The invention can be fully understood by referring to the following description and claims, taken in conjunction with the accompanying drawing in which:

FIG. 1 is a side view of the fluid pressure pulser apparatus of the invention;

FIG. 2 is a view taken along line 1—1 of the rotatable disc or valve portion of said fluid pressure pulser apparatus, the view being superimposed over the underlying grooves 11 and 12 and discharge lines 13 and 14;

Figure 1:
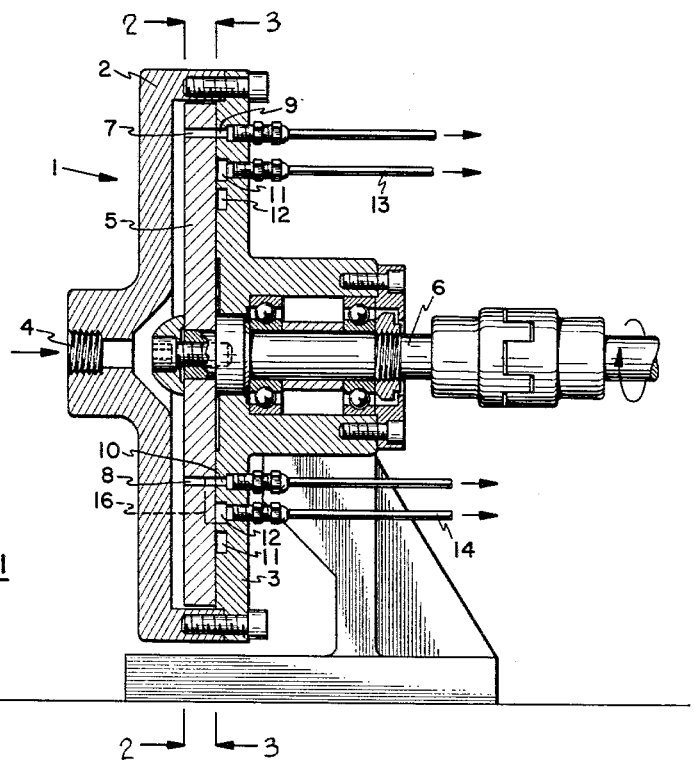

In brief, the apparatus can be described as follows. There is provided a casing with walls, said casing having a central cavity into which an incompressible fluid under pressure can be introduced. Adjacent to one wall of the casing is a rotatable disc or valve having at least one through passage and a corresponding pressure reduction slot or groove. The wall adjacent to said disc is provided with at least one through passage and one annular drain groove, said drain groove being provided with a through drain passage. A through passage of said adjacent wall and a through passage of said disc are so positioned that rotation of the disc can cause said two passages to register and communicate with each other. The through passages of the adjacent wall are connected to transmission lines through which hydraulic pressures are transmitted.

In accordance with the invention the three-dimensional shape of each of the pressure reduction passageways is selected to give the desired time-pressure release characteristics. The specific shape of the leading portions of the reduction slots determines the pressure reducing orifice size at any instant of the reduction cycle. In similar fashion, the pressure applying passageway extending through the rotating disc is sized and shaped in a manner to produce the desired time-pressure rise characteristics.

Each pressure reduction slot of the disc is so positioned that it communicates with an annular drain groove in the adjacent wall. When the disc is rotated, the through passages of the disc register with the through passages of the adjacent wall, which latter passages are connected to the transmission lines. Thus the hydraulic pressures from the fluid introduced into the cavity in the casing are transmitted through the registered passages and along the transmission lines. When a pressure reduction slot, located within the face of said disc, communicates with the through passage of the adjacent wall of the casing, the pressures within the transmission lines are released into the corresponding annular drain groove. By proper spacing and shaping or contouring of the passages and pressure reduction slots, any sequence of programmed pressure impulses and subsequent pressure release can be transmitted through the transmission lines. The transmission lines, of course, are operably connected to that portion of the hydraulic system which applies the ultimate pressures to the material or device to be modified. It can be readily appreciated that the inclusion of the fluid pressure pulser apparatus within a hydraulic system permits the planned control and programming of highly complex and exactly repeatable operations. The drawing is now referred to.

FIG. 1 represents a preferred embodiments of the fluid pressure pulser apparatus of this invention. A casing 1, having a central cavity, has an outer wall 2, and an inner wall 3 having a central bore. Outer wall 2 has an inlet opening 4 to allow a hydraulic fluid to be introduced into said central cavity at any desired pressure. Located adjacent to inner wall 3 is rotatable annular disc or valve 5 which has two faces, one face contiguous to inner wall 3, and one face contiguous to said central cavity. Rigidly attached to the central axis of rotatable annular disc 5, and extending through the bore of inner wall 3, is drive shaft 6 which is connected to any suitable drive means. Drive shaft 6 is packed and sealed to prevent any hydraulic leakage through the bore of inner wall 3. Rotatable disc 5 has through passages 7 and 8, each of which provides a passageway through rotatable disc 5. Inner wall 3 contains through passages 9 and 10 which are connected to hydraulic transmission lines, which lines can transmit the hydraulic pressure to the operating area. Inner wall 3 also contains annular drain grooves 11 and 12, and through drain passages 13 and 14, the latter of which are respectfully connected to, and in communication with, annular drain grooves 11 and 12.

Figures 2, 3:
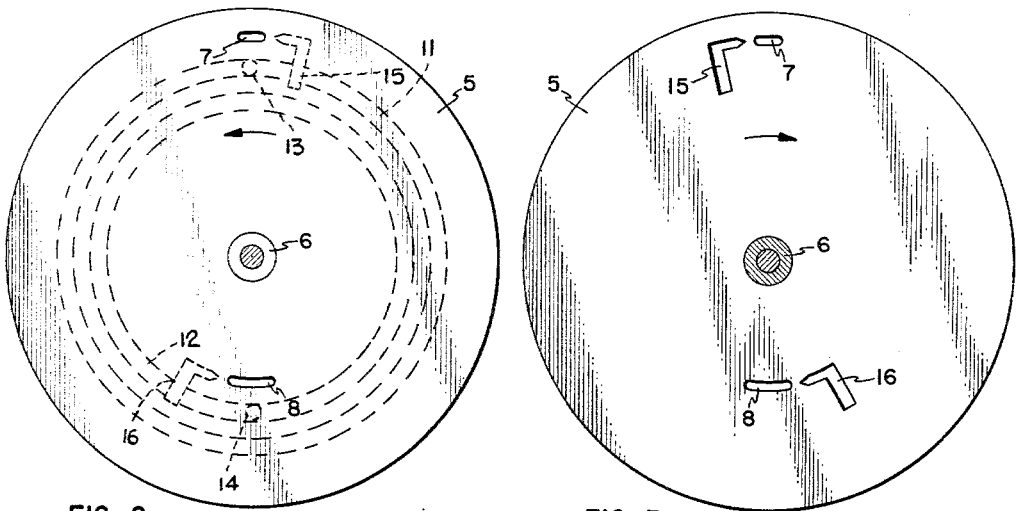
FIG. 3 is a view taken along line 2—2 of the rotatable disc of said fluid pressure pulser apparatus.

FIG. 2 is a view taken along the line 1—1 of FIG. 1 wherein the face of rotatable disc 5, which face is contiguous to the central cavity of casing 1, is seen. This view is superimposed over annular drain grooves 11 and 12, and drain lines 13 and 14. In this view, through passages 7 and 8 are seen in front view. Pressure reduction grooves 15 and 16 are on the opposing face of rotatable disc 5 which is contiguous with inner wall 3. Pressure reduction slot 16 can also be seen in cross-sectional view in FIG. 1. Pressure reduction slot 15 is positioned relative to annular drain groove 11 (groove 11 is formed in inner wall 3 of the casing 1) and through passage 9 so that, when pressure reduction slot 15 lines up (registers) with through passage 9, the pressure within the hydraulic transmission line connected to through passage 9 is released by allowing the fluid to flow through pressure reduction slot 15 into annular drain groove 11 and out through drain passage 13. Likewise, pressure reduction slot 16 is positioned with respect to through passage 10 and annular drain groove 12 of inner wall 3 so that, when pressure reduction slot 16 lines up with through passage 10, the hydraulic pressure within the transmission line connected to through passage 10 is released by allowing the fluid to flow through pressure reduction slot 16, into annular drain groove 12 and out through drain passage 14.

FIG. 3 is a view taken along the line 2—2 of FIG. 1. This view shows the face of rotatable disc 5 which is contiguous to inner wall 3. Through passages 7 and 8 have already been shown in FIGS. 1 and 2, and programmed pressure reduction passages 15 and 16 have already been shown in FIG. 2.

An example of the operation of the fluid pressure pulser follows. Rotatable disc 5 is suitably prepared by cutting programmed through passages (corresponding to through passages 7 and 8) therein, and providing each through passage with a pressure reduction slot (corresponding to pressure reduction slots 15 and 16) to release the pressure after it has been applied to the through passages (9 and 10) of inner wall 3. Rotatable disc 5 is then rigidly connected to drive shaft 6 and the assembly is rotatably journalled in casing 1. Hydraulic fluid, under any desired pressure, is introduced into casing 1. The drive means (not shown) connected to drive shaft 6, is actuated so as to cause rotatable disc 5 to rotate about its axis. As each through passage of rotatable disc 5, i.e. through passage 7, registers with a through passage in inner wall 3, i.e. through passage 9, hydraulic fluid, under pressure, passes through the connecting passages in rotatable disc 5 and inner wall 3, e.g. 7 and 9, into a transmission line. The hydraulic fluid in the line is maintained at this changed pressure until the rotation of disc 5 causes pressure reduction slot, e.g. 15, to register with a through passage, e.g. 9, in inner wall 3. When through passage 9 registers with pressure reduction slot 15, hydraulic fluid from the transmission line is allowed to flow through pressure reduction slot 15 into annular drain groove 11 and thence out through drain passage 13. This constitutes one cycle and is repeated as rotatable disc 5 rotates.

It will be understood that it is possible to place as many through passages and accompanying pressure release slots in the inner wall 3 and in the rotatable disc 5 as is necessary. These through passages can be equidistant from the center axis of rotatable disc 5, or they may be placed at various locations on said disc. Two or more of said through passages can be located equidistant from the center axis of said disc. It will be understood that for each series of equidistant through passages (i.e. located in a concentric circle), there will be an annular drain groove in inner wall 3. It will also be understood that for each annular drain groove, there will be at least one through drain passage, e.g. through drain passage 13. It will be further understood that the size of the through passages, and the design of the shape of the pressure reduction slots can be adapted to achieve a wide variety of effects. Thus, pressure reduction slot 15, as shown in FIG. 3, is L-shaped. The length of the bottom of the L can be either short or long. The pressure reduction slots could be made so as to release the back pressure at a very fast rate, or at a very slow rate, depending on the ultimate desired result. Therefore, the number of transmission circuits which can be controlled by a single disc is limited only by the diameter of the rotatable disc. But unlimited numbers of discs and housings, with the necessary ports and piping, may be mechanically synchronized and hydraulically connected as required to provide the number of circuits needed.

Figure 4:
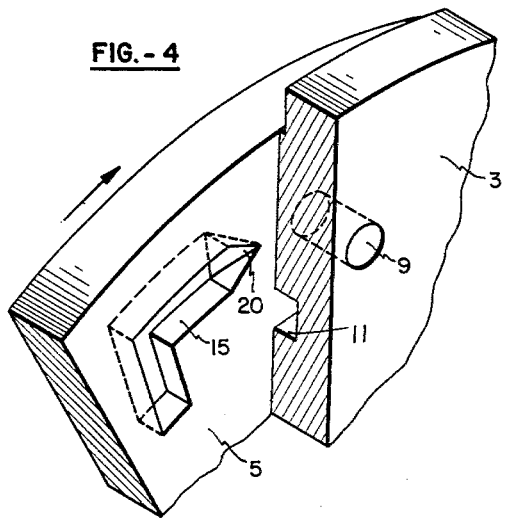
FIG. 4 is an enlarged fragmentary schematic view of the novel pressure relief passageway.
Figure 5:
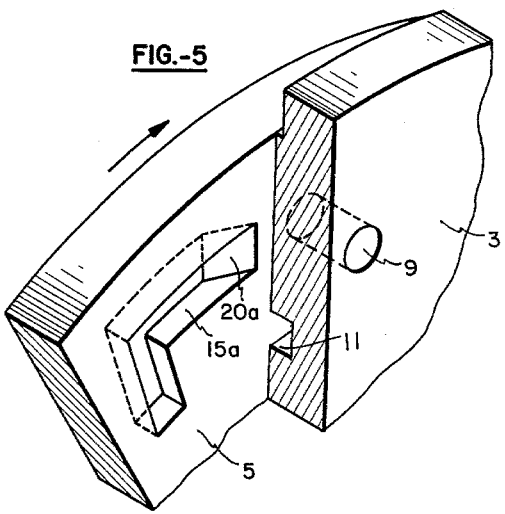
FIG. 5 is a view similar to FIG. 4 showing an alternate form of relief passageway.
Figure 6:
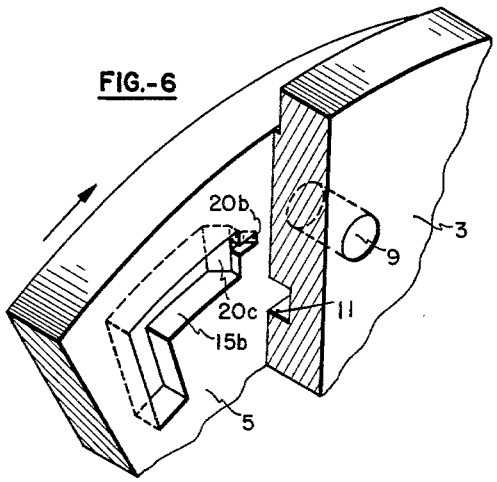
FIG. 6 is a view similar to FIG. 4 showing still another embodiment of relief passageway.

The manner in which the invention provides for the controlled rate of pressure application and removal from the passageway 9 may best be seen by reference to FIGS. 4–8 inclusive. Schematic FIGS. 4–7 are greatly enlarged and omit various portions of the mechanism for clarity. In FIG. 4 the relief groove or passageway 15 is moving in a circular path in the direction of the arrow. As the leading point designated 20 of the passageway 15 approaches and overlies the passageway 9, a small triangular orifice of limited area and depth is produced to relieve the pressure in the passageway 9. Thereafter as the overlapping area of the leading portion of the passageway 15 is increased upon subsequent rotation of the disc 5, a larger port area is produced, resulting in a corresponding faster reduction of the pressure in the passageway 9. An alternate shaped passageway 15a is shown in FIG. 5. The pressure relief port 15a has a wedge-shaped leading edge portion which will as it progresses to overlie passage 9 produce a semicircular relief port of gradually increasing area and depth. In FIG. 6 a still further alternate form of relief port passageway 15b is shown. In this form, the leading edge of the port 20b is reduced in width and depth to produce a very slow initial pressure reduction rate during its initial overlying relationship with the passage 9. The sharp transition from the narrow width portion 20b to the full width portion 20c of the passageway results in a sharp increase in the amount of common area between the passageway 9 and port 15b and produces a sharp further reduction in pressure in the passageway 9.

While the foregoing explanation with regard to FIGS. 4, 5 and 6 has been with reference to the structure by which a predetermined time-pressure reduction pattern is obtained, similar principles may be employed to control the time-pressure pattern during the application of the pressure to the passageway 9.

Figure 7:
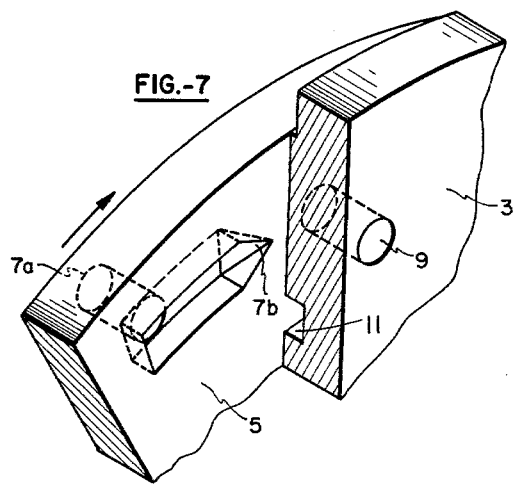
FIG. 7 is a view similar to FIG. 4 showing one form of shaped passageway for applying the pressure pulse with a controlled time-pressure rise characteristic.

Referring to FIG. 7 in particular, one form of possible pressure application passageway is designated 7a. It will be understood that in FIG. 7 as well as FIGS. 4–6, only the boundaries of the passageway in the disc 5 have been shown without illustrating the structure of the disc. In FIG. 7, the liquid pressure applied through inlet opening 4 (FIG. 1) communicates with the opening 7a in the disc 5. This pressure is transmitted to the interior of the rectangular chamber to the apex end thereof designated 7b. As the passageway 7a rotates with the disc 5, the leading apex portion 7b overlaps the passage 9 to apply pressure thereto through a triangular orifice of limited cross-section and fluid handling capacity. Thereafter, upon further movement of the disc the pressure passage apex 7b exposes an increased common area to effect an accelerated rate of pressure rise.

Figure 8:
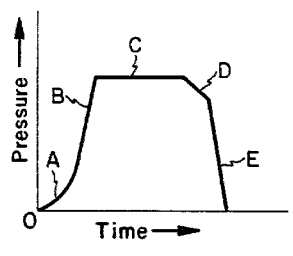
FIG. 8 is a graph of a representative time-pressure pattern produced by the invention.

An understanding of the foregoing description of the operation of the passageways 7a and 15 may best be had by reference to FIG. 8. In FIG. 8 a representative graph of the pressure in passageway 9 with respect to time is shown. At first during the initial overlap of the apex 7b with passage 9, the pressure buildings up at a relatively low rate in the portion of the curve designated A. Thereafter, the pressure rise assumes a steeper slope at portion B to the pressure level of the inlet connection 4 which is represented in FIG. 8 as the horizontal portion C of the graph. As the point 20 of the pressure reduction passageway 15 first overlies the passageway 9, a gradual pressure reduction along the line 20 is produced along the portion D of the curve. Thereafter, once the full area of the passageway 15 overlies the passage 9, a sharp dropoff in pressure along the portion of the graph designated E is produced.

It is possible to obtain extremely rapid pulsations in a single transmission line by repetitive placing of through passages on the same concentric circle on the disc, as measured from the center axis of the disc, and adjusting the speed of rotation of the rotatable disc. The frequency of pulsing will be limited only by the size of the disc and the speed of the disc. It can be appreciated that an extremely high level of versatility is possible through the use of this apparatus.

The fluid pressure pulser apparatus can be made from any of the ordinary materials of construction and design, and such will be apparent to those skilled in the art. The size of the fluid pressure pulser can likewise be varied to suit the purpose desired, as will be apparent to one skilled in the art.

Although the invention has been described in its preferred form with a certain degree of particularity, it is understood that the present disclosure of the preferred form has been made only by way of example, and that numerous changes in the details of the construction and the combination and arrangements of parts may be resorted to without departing from the spirit and scope of the invention as hereinafter claimed.

What is claimed is:

1. A distributor for selectively transmitting pressure pulses to a hydraulic fluid system which comprises in combination:
    (a) a casing,
    (b) means defining a cavity within said casing, said cavity being defined in part by an inner wall,
    (c) means for supplying an incompressible fluid under pressure to said cavity,
    (d) a distributing valve rotatably journalled in said casing and mounted for complete and continuous unidirectional rotation within said cavity, said valve having a first face contiguous to said inner wall,
    (e) means defining a plurality of radially staggered through passages in said inner wall interconnecting said cavity and said fluid system,
    (f) means defining a plurality of concentric annular 360 degree drain grooves in said inner wall of said casing, said annular drain grooves centered about an axis of rotation of said distributing valve and radially displaced relative to said through passages in said inner wall,
    (g) means defining a plurality of exhaust passages in said inner wall, said exhaust passages interconnecting said annular drain grooves and drain means,
    (h) means defining a plurality of radially staggered pressure application passages extending through said distributing valve, each of said passages being cyclically and singularly registerable with a through passage in said inner wall upon rotation of said distributing valve and including a leading edge portion in the first face of said valve of reduced area and depth relative to the cross-sectional dimension of the following portions of said passages whereby a programmed time-pressure pattern of pressure rise is transmitted to said fluid system,
    (i) means defining a plurality of radially extending pressure reduction grooves in the first face of said distributing valve, said pressure reduction grooves each communicating throughout a complete 360 degree rotation of said valve with its respective annular drain groove in said inner wall and cyclically registerable with a through passage in said inner wall upon rotation of said distributing valve, said pressure reduction grooves being circumferentially displaced relative to said passages extending through said valve, and having a leading end portion of reduced area and depth relative to the cross-sectional dimension of the following portion of said groove whereby a desired time-pressure pattern of pressure reduction is obtained, and
    (j) means for completely and continuously rotating said distributing valve.

2. A hydraulic fluid pressure distributor in accordance with claim 1 wherein at least one of said pressure application passages includes a triangularly shaped leading edge portion and wherein at least one of said pressure reduction grooves includes a rectangular leading edge portion of reduced width and a following rectangular portion of greater predetermined width than said leading end portion.

References Cited by the Examiner

UNITED STATES PATENTS

| 218,348 | 8/1879 | Watkins | 137—625.21 |
|---|---|---|---|
| 345,056 | 7/1886 | Henneboehle | 137—625.21 |
| 592,279 | 10/1897 | Conihe | 251—208 |
| 1,121,140 | 12/1914 | Schoonmaker | 137—625.21 |
| 1,546,579 | 7/1925 | Hammond | 137—625.23 X |
| 2,079,041 | 5/1937 | Ryan et al. | 137—625.21 |
| 2,477,590 | 8/1949 | Ferwerda et al. | 137—625.21 |

FOREIGN PATENTS 918,439 10/1946 France.

MARTIN P. SCHWADRON, *Acting Primary Examiner.*

M. CARY NELSON, *Examiner.*

A. ROSENTHAL, *Assistant Examiner.*